United States Patent

Grandel et al.

[15] 3,643,981
[45] Feb. 22, 1972

[54] STEERING COLUMN ASSEMBLY SUPPORT

[72] Inventors: Leonard F. Grandel, Carrollton; Floyd A. Schluckebier, Frankenmuth; Dan R. Kimberlin, Saginaw, all of Mich.

[73] Assignee: General Motors Corporation, Detroit, Mich.

[22] Filed: Apr. 30, 1970

[21] Appl. No.: 33,234

[52] U.S. Cl. .......................................... 280/87 R, 74/492
[51] Int. Cl. .......................................................... B62d 1/18
[58] Field of Search ............... 280/87; 74/492, 493; 248/26

[56] References Cited

UNITED STATES PATENTS

| | | | |
|---|---|---|---|
| 3,538,783 | 11/1970 | Butts | 74/492 |
| 2,936,141 | 5/1960 | Rapata | 248/26 |
| 3,300,229 | 1/1967 | Kishline | 280/87 |
| 3,065,941 | 11/1962 | Loftis | 248/26 |
| 3,531,070 | 9/1970 | Roddy | 248/26 X |

*Primary Examiner*—Kenneth H. Betts
*Attorney*—W. E. Finken and D. L. Ellis

[57] ABSTRACT

A vehicle steering column assembly is engaged by a support arrangement intermediate the ends thereof which generally rigidly connects a portion of the column assembly to the vehicle body but which is permanently deformable upon relative displacement between the column assembly and vehicle body and thereafter again rigidly supports the column assembly in the displaced position and without exerting thereon substantial restoring forces, the support arrangement including a support member having inner and outer rings attached respectively to the column assembly and vehicle body and interconnected by a plurality of permanently deformable webs the thickness and configuration of which determine the strength of the support member.

3 Claims, 4 Drawing Figures

INVENTORS
Leonard F. Grandel,
Floyd A. Schluckebier &
BY Dan R. Kimberlin

ATTORNEY

STEERING COLUMN ASSEMBLY SUPPORT

This invention relates generally to shaft supports and more particularly to vehicle steering column assembly supports.

In modern automobiles the steering column assembly typically includes a steering shaft having a steering wheel and hub assembly at one end thereof and having the other end connected to the vehicle steering gear rigidly fastened to the vehicle frame. The steering shaft is journaled in a mast jacket generally at the two ends of the latter and a portion of the mast jacket forward of the steering wheel is rigidly fastened to the underside of the vehicle instrument panel to thereby support the steering wheel and hub end of the steering shaft. The mast jacket normally protrudes through a clearance aperture in the firewall or toeplate of the vehicle body and is supported adjacent the aperture by some type of resilient bushing fixedly secured to the vehicle body so as to maintain the stability of that part of the column assembly projecting into the interior of the vehicle body beyond the rigid instrument panel connection.

During normal aging of a vehicle having the above-described support arrangement, the vehicle body may bodily shift relative to the frame. Such shifting causes displacement of the steering column assembly relative to the vehicle body, thereby compressing a portion of the aforementioned resilient bushing. The compressed bushing exerts a restoring force on the mast jacket tending to restore the latter to its original position relative to the vehicle body. The jacket, however, is permanently held in the shifted position by the vehicle frame and the resilient restoring force is, therefore, virtually permanently maintained on the mast jacket and, through bearings, on the steering shaft. The force thus imposed on the steering shaft may create misalignment between the steering shaft and steering gear resulting in improper wear on the bearings of both the steering shaft and steering gear. In a support arrangement according to this invention the resilient bushing is replaced by a support member operable to normally rigidly connect the steering column assembly to the vehicle body yet permanently deformable to accommodate shifting of the steering column assembly relative to the vehicle body without imposing a permanent restoring force on the former.

The primary feature of this invention is that it provides an improved shaft support arrangement wherein deformation of a support member by the shaft does not give rise to a permanent restoring force on the shaft. Another feature of this invention resides in the provision of a shaft support member including permanently deformable web means which normally rigidly support the shaft but which permanently deform in response to displacement of the shaft and thereafter permanently assume a new support position without imposing significant restoring forces on the shaft. Yet another feature of this invention resides in the provision of means for predetermining the rigid strength of the web means so as to control the resistance of the support arrangement to displacement of the steering column assembly. A still further feature of this invention resides in the provision of a support member wherein the web means include a plurality of generally radially extending webs separating inner and outer rings and wherein the strength of each web is determined by the thickness and configuration thereof.

These and other features of this invention will be readily apparent from the following specification and from the drawings wherein.

Figure 1:
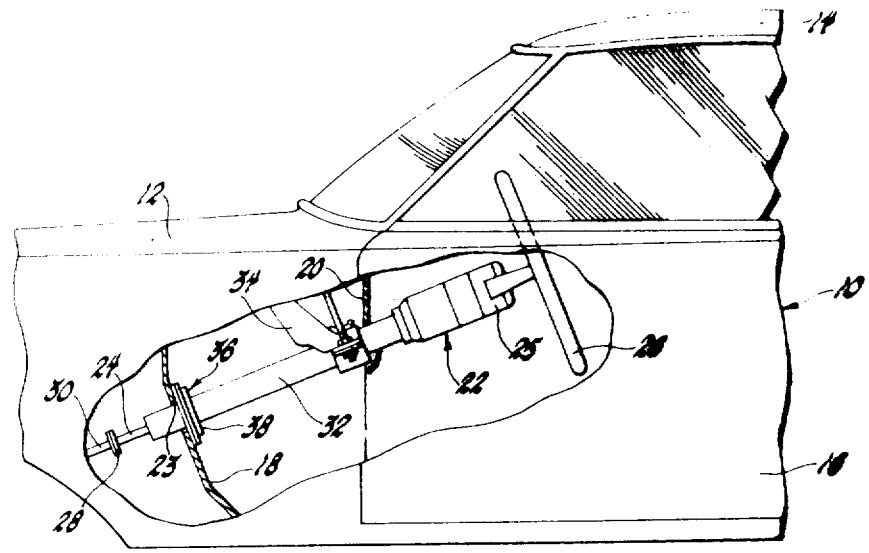
FIG. 1 is a fragmentary partially broken away side elevational view of an automobile-type vehicle including a steering column assembly and a steering column assembly support arrangement according to this invention.

Referring now to FIG. 1 of the drawings, an automobile-type vehicle body generally designated 10 has a front fender and hood structure 12, a roof structure 14 and a front door 16 conventionally vertically hinged thereon and is mounted on a conventional frame assembly, not shown, through a plurality of vibration-isolating fastening arrangements. The lower forward portion of the vehicle body interior is bounded by a conventional toeplate or firewall 18 while an instrument panel 20 extends transversely across the vehicle body interior rearwardly and generally above the toeplate 18. A steering column assembly generally designated 22 projects from interiorly of the vehicle body generally into the engine compartment through a clearance aperture 23 in the toeplate 18, FIG. 2.

The steering column assembly includes a steering shaft 24 having a conventional hub assembly 25 and steering wheel 26 mounted on one end thereof generally adjacent the instrument panel 20. One half of a flexible coupling assembly 28 is mounted on the other end of the steering shaft forwardly of the toeplate. The other half of the flexible coupling assembly 28 is secured to an input shaft portion 30 of the vehicle steering gear, not shown, which itself is rigidly attached to the vehicle frame. A generally cylindrical mast jacket 32 surrounds the steering shaft 24 and extends from adjacent the hub assembly 25, through the clearance aperture 23 and generally to the other end of the steering shaft adjacent flexible coupling assembly 28. Conventional roller bearings, not shown, inside the mast jacket at each end thereof support the steering shaft for rotation relative to and within the mast jacket. The mast jacket, generally near the steering wheel end thereof, is captured by a bracket 34 rigidly attached to the vehicle body and is thus supported at one end by the vehicle body through bracket 34 and at the other end by the vehicle frame through the steering gear and flexible coupling assembly 28. Intermediate the two end supports and adjacent the toeplate 18, the steering column assembly is relatively rigidly connected to the vehicle body through a shaft support arrangement according to this invention and generally designated 36, the purpose of which support arrangement is to add rigidity to the steering column assembly so as to stabilize the relative heavy hub assembly and steering wheel projecting into the interior of the vehicle body beyond bracket 34.

Figure 3:
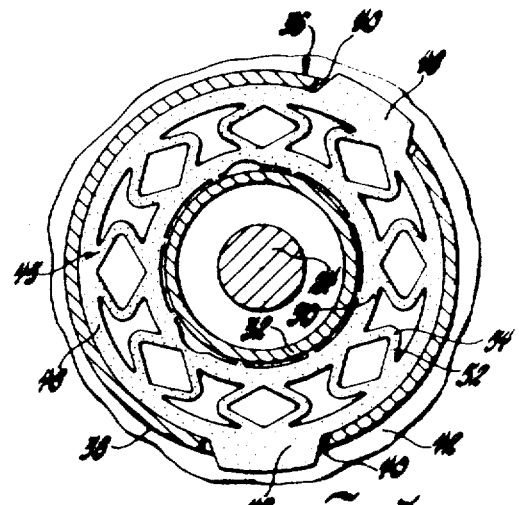
FIG. 3 is a view taken generally along the plane indicated by line 3—3 in FIG. 2.

As best seen in FIG. 3, the shaft support arrangement 36 includes a cylindrical clamp 38 having a pair of key apertures 40 therein, an annular flange 42 and an inturned retaining lip 44. A support member generally designated 45 is received within the clamp 38 and includes an outer ring 46 having a pair of integral key projections 48 thereon, an inner ring 50 and a plurality of generally radially extending webs 52 interconnecting the inner and outer rings. The inner and outer rings and the webs are integrally fabricated in a conventional manner, as by injection molding, from a high-density polyethylene resin to thus provide a support member having certain mechanical characteristics unique to a number of fabricating compounds commonly called plastics. More particularly, the webs 52 in the support member normally rigidly interconnect the inner and outer rings and also maintain concentricity therebetween. Forces on the inner and outer rings tending to alter the concentricity thereof are applied to the webs generally at the terminals or ends thereof and are rigidly resisted thereby until such forces achieve a predetermined minimum magnitude dependent upon the size and configuration of the webs as described hereinafter. Forces in excess of the aforementioned minimum magnitude function to bend the webs, which, due to the physical properties of the material, permanently deform or cold flow. When the deforming force diminishes below the minimum magnitude cold flow ceases and virtually no restoring forces arise in the webs tending to return the inner and outer rings to concentricity. Generally, a variety of plastics are known to function in the manner so described, and, in particular, a support member fabricated from high-density polyethelene resin marketed by E. I. DuPont DeNemours & Company, Inc. under the trade name 7030 Alathon has been found to function as recited hereinbefore.

Figure 4:
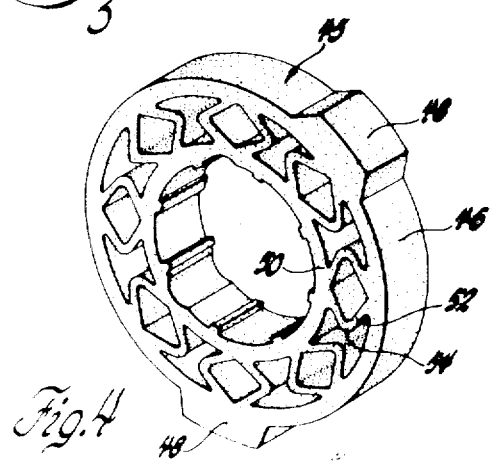
FIG. 4 is a perspective view of the support member according to this invention.

With particular reference now to FIGS. 3 and 4, the webs 52 in the support member 45 are generally rectangular in cross section and are bowed or kinked as at 54. Forces tending to alter the concentricity of the inner and outer rings necessarily place several of the webs in compression and several in tension. In either case the bow or kink 54 functions to predetermine the location along the particular web at which substantial cold flow or permanent deformation will occur. Further, tensile or compressive forces on the ends or terminals of the web induce corresponding stresses within the web, the magnitude of which stresses, for any given magnitude of force, are directly proportional to the cross-sectional area of the web. Since the magnitude of stress required to induce cold flow in the web material is relatively accurately known, the cross-sectional area of the web can be varied so as to produce a web which will rigidly resist tensile or compressive forces of any desired magnitude. In this manner the strength of each web can be predetermined.

Figure 2:
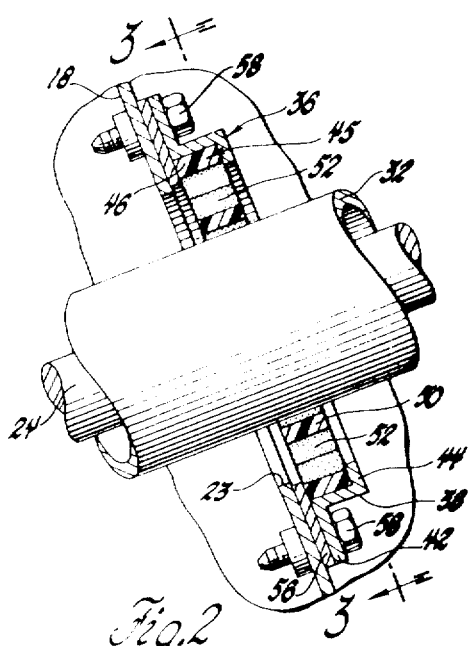
FIG. 2 is an enlarged and partially broken away view of a portion of FIG. 1 and showing the steering column assembly support arrangement.

As best seen in FIGS. 2 and 3, inner ring 50 is relatively tightly received around the outside of the mast jacket 32 and the outer ring 46 is received within the clamp 38 with key projections 48 on the former being engaged in apertures 40 in the latter and with one edge of the outer ring abutting retaining lip 44. An annular clamping plate 56 abuts annular flange 42 of the clamp 38 and the other edge of the outer ring 46 and both the clamp 38 and clamping plate 56 are rigidly attached to the toeplate 18 by threaded fasteners 58. The support member 45 is thereby rigidly and nonrotatably mounted on the vehicle body with the webs 52 rigidly supporting the central portion of the steering column assembly on the vehicle body.

As the vehicle ages and experiences normal usage, the vibration-insulating fasteners between the vehicle frame and vehicle body may have a tendency to permit some permanent bodily shiftable movement of the latter relative to the former. The steering column assembly, being rigidly attached to both, is thus displaced relative to the clearance aperture 23 in the toeplate 18 thereby tending to alter the concentricity of the inner and outer rings 50 and 46. The support member 45, of course, initially resists displacement of the central portion of the steering column assembly thus placing the latter in simple beam flexure. The force exerted by the flexed column assembly on the support member is directly proportional to the amount of bending or flex which has occurred. If the displacement or bending of the column assembly is very slight, the distorting force on the support member will be rigidly resisted by the webs 52 thus placing eccentric forces on the steering shaft and steering gear bearings which, while not desirable, are within tolerable limits. If the displacement is significant, the distorting force on the support member 45 will exceed the aforementioned predetermined minimum thus initiating cold flow or permanent deformation of the webs at the bows or kinks 54. As the webs deform the support member 45 distorts and gradually relieves the flex in the steering column assembly until the force exerted thereby diminishes to a magnitude below that required to initiate cold flow of the webs. Once the webs cease to flow, rigidity returns to the support member 45 and the central portion of the column assembly is rigidly supported on the vehicle body in the displaced position relative thereto.

It is often desirable, in applications where cold flow is expected, to limit the amount thereof so as not to cause rupture or tearing of the material. In shaft support arrangements according to this invention the amount of cold flow occurring at the bow in each web for a given deformation of entire web can be reduced merely by increasing the number of bows or kinks in the web. In this way an equal stress is resisted at each bow with the sum of the deformations at each bow being equal to the total deformation of the web. More particularly, with reference to FIGS. 3 and 4, by placing one more bow in each web 52 of the support 45 the resistance of the former to tensile or compressive forces would remain unchanged but the amount of cold flow at each bow or kink would be one-half of the flow experienced by the original bow or kink under an equivalent distorting force.

While the preferred embodiment relates to steering column assemblies having nonrotatable mast jackets, it will be apparent to those skilled in the art that shaft supports according to this invention could be adapted for use with rotating shafts. Such an alternate embodiment would merely require the use of some well-known bearing device for rotatably supporting the shaft within the inner ring. It will be further apparent that the specific configuration of the webs of the support member is dependent solely upon the particular application and the strength desired in the support arrangement.

Having thus described the invention, what is claimed is:

1. In a vehicle having a frame member, a body member mounted on said frame member and including a wall portion, and a steering column assembly projecting through said wall portion and supported on one side of the latter on said body member and on the opposite side of said wall portion on said frame member such that relative movement between said body member and said frame member effects lateral displacement of an intermediate portion of said steering column assembly relative to said wall portion, an intermediate steering column assembly support adapted to substantially rigidly connect said intermediate portion of said steering column assembly to said wall portion and to permanently yield in response to substantial sustained lateral displacement of said intermediate portion thereby to prevent sustained bending of said steering column assembly while maintaining a substantially rigid intermediate connection to said wall portion comprising in combination, an inner mount adapted for rigid connection to said intermediate portion of said steering column assembly, an outer mount adapted for rigid connection to said wall portion, means defining a plurality of spokelike support members disposed generally radially of said steering column assembly between said inner and said outer mounts, means on each of said support members operative to impart thereto substantial rigidity with respect to forces imposed thereon and directed generally radially of said steering column assembly so that said inner mount and said intermediate portion are maintained substantially rigid with respect to said outer mount and said wall portion, and means on each of said support members operative to effect permanent lengthwise deflection thereof in response to application thereto of generally radially directed forces exceeding a predetermined minimum magnitude thereby to alleviate sustained bending of said steering column assembly by permitting permanent lateral displacement of said inner mount and said intermediate portion relative to said outer mount and said wall portion.

2. In a vehicle having a frame member, a body member mounted on said frame member and including a wall portion, and a steering column assembly projecting through said wall portion and supported on one side of the latter on said body member and on the opposite side of said wall portion on said frame member such that relative movement between said body member and said frame member effects lateral displacement of an intermediate portion of said steering column assembly relative to said wall portion, an intermediate steering column assembly support adapted to substantially rigidly connect said intermediate portion of said steering column assembly to said wall portion and to permanently yield in response to substantial sustained lateral displacement of said intermediate portion relative to said wall portion thereby to prevent sustained bending of said steering column assembly while maintaining a substantially rigid intermediate connection to said wall portion comprising in combination, an inner ring adapted for rigid connection to said intermediate portion of said steering column assembly, an outer ring disposed concentrically about said inner ring and adapted for rigid connection to said wall portion, a plurality of generally radially directed spokelike support members integral with each of said inner and said outer rings and disposed therebetween, each of said support members having a load bearing cross-sectional area of sufficient size to impart to said support member substantial rigidity with respect to forces imposed thereon and directed generally radially of said steering column assembly so that said inner ring and said intermediate portion of said steering column assembly are maintained substantially rigid with respect to said outer ring and said wall portion, and means on each of said support members defining a minimum strength section thereof whereat permanent yielding occurs when said support member is subjected to generally radially directed forces exceeding a predetermined minimum magnitude, said permanent yielding being accompanied by concurrent permanent lengthwise deflection of each of said support members thereby to alleviate sustained bending of said steering column assembly by permitting permanent lateral displacement of said inner ring and said intermediate portion of said steering column assembly relative to said outer ring and said wall portion.

3. In a vehicle having a frame member, a body member mounted on said frame member and including a wall portion, and a steering column assembly projecting through said wall portion and supported on one side of the latter on said body member and on the opposite side of said wall portion on said frame member such that relative movement between said body member and said frame member effects lateral displacement of an intermediate portion of said steering column assembly relative to said wall portion, an intermediate steering column assembly support adapted to substantially rigidly connect said intermediate portion of said steering column assembly to said wall portion and to permanently yield in response to substantial sustained lateral displacement of said intermediate portion relative to said wall portion thereby to prevent sustained bending of said steering column assembly while maintaining a substantially rigid intermediate connection to said wall portion comprising in combination, an annular plastic connecting member including an outer ring and an inner ring disposed concentrically within said outer ring and a plurality of integral webs disposed between said inner and said outer rings, means rigidly connecting said inner ring to said intermediate portion of said steering column assembly, and means rigidly connecting said outer ring to said wall portion, said webs being situated in a plurality of angularly spaced pairs in which pairs each of said webs is bowed generally at the center thereof away from the other of said webs in the pair thereby to define a plurality of generally diamond-shaped spokelike support members disposed radially between said inner and said outer rings, each of said support members having a load bearing cross-sectional area sufficient to impart to said support member substantial rigidity with respect to forces imposed thereon and directed generally radially of said steering column assembly so that said inner ring and said intermediate portion are maintained substantially rigid with respect to said outer ring and said wall portion, said bow in each of said webs defining a section of minimum strength thereof whereat permanent yielding occurs when said support member is subjected to generally radially directed forces exceeding a predetermined minimum magnitude, said permanent yielding being accompanied by concurrent lengthwise deflection of said support members thereby alleviating sustained bending of said steering column assembly by permitting permanent lateral displacement of said inner ring and said intermediate portion relative to said outer ring and said wall portion.

* * * * *